United States Patent [19]

Kiencke et al.

[11] 4,099,495
[45] Jul. 11, 1978

[54] METHOD AND APPARATUS TO DETERMINE THE TIMING OF A PERIODICALLY REPETITIVE EVENT WITH RESPECT TO THE POSITION OF A ROTATING BODY, AND MORE PARTICULARLY IGNITION TIMING, FUEL INJECTION TIMING, AND THE LIKE, IN AUTOMOTIVE INTERNAL COMBUSTION ENGINES

[75] Inventors: Uwe Kiencke, Ludwigsburg; Ulrich Flaig, Markgröningen; Martin Zechnall, Schwieberdingen; Günter Hönig, Markgröningen, all of Fed. Rep. of Germany

[73] Assignee: Robert Bosch GmbH, Stuttgart, Fed. Rep. of Germany

[21] Appl. No.: 719,068

[22] Filed: Aug. 30, 1976

[30] Foreign Application Priority Data

Sep. 3, 1975 [DE] Fed. Rep. of Germany ....... 2539113

[51] Int. Cl.² ............................ F02B 3/00; F02P 5/04; G06F 15/20
[52] U.S. Cl. ........................... 123/32 EB; 123/32 EK; 123/32 EG; 123/117 D; 123/148 S; 123/198 DC; 364/442; 364/569
[58] Field of Search ......... 123/117 D, 117 R, 32 EA, 123/32 EB, 32 EC, 32 EK, 32 EG, 148 S, 198 DC; 364/550, 569, 424, 442

[56] References Cited

U.S. PATENT DOCUMENTS

| | | | |
|---|---|---|---|
| 3,749,073 | 7/1973 | Asplund | 123/117 D |
| 3,752,139 | 8/1973 | Asplund | 123/117 D |
| 3,767,902 | 10/1973 | Estes et al. | 364/424 |
| 3,830,207 | 8/1974 | Joseph | 123/117 D |
| 3,834,361 | 9/1974 | Keely | 123/32 EA |
| 3,874,351 | 4/1975 | Asler et al. | 123/117 R |
| 3,903,857 | 9/1975 | Honig et al. | 123/117 D |
| 3,906,207 | 9/1975 | Rivere et al. | 123/117 D |
| 3,921,610 | 11/1975 | Hartig | 123/117 D |
| 3,923,021 | 12/1975 | Stark | 123/117 R |
| 3,927,648 | 12/1975 | Kawai et al. | 123/117 D |
| 3,939,738 | 2/1976 | Adey et al. | 123/32 EA |
| 3,969,614 | 7/1976 | Moyer et al. | 123/117 D |
| 3,990,412 | 11/1976 | Zechnall et al. | 123/117 D |
| 3,990,417 | 11/1976 | Tershak | 123/117 R |
| 3,998,193 | 12/1976 | Ives et al. | 123/117 D |
| 4,009,697 | 3/1977 | Chateau | 123/117 D |

OTHER PUBLICATIONS

Reference Data for Radio Engineers, 1975, Howard W. Sams & Co. Inc., pp. 40-15 to 40-23.

Primary Examiner—Charles J. Myhre
Assistant Examiner—Andrew M. Dolinar
Attorney, Agent, or Firm—Flynn & Frishauf

[57] ABSTRACT

A pair of marker signals are generated with respect to a predetermined crankshaft position; the leading edge of the marker signal is used as a control edge to generate, by digital calculation, a digital control signal calculated in accordance with engine operating characteristics, as related to speed, loading, and the like, and providing a numerical output value used as a control value to control the timing of a pulse which may, depending on use, control: ignition timing; fuel injection timing; transmission gear shifting, the data relating engine performance, with respect to loading, speed, and other parameters such as temperature, starting conditions, and the like, being stored in a data memory. Calculation of the digital control signals and determination, by timed sequential counting out, are carried out independently from each other and during time overlap. Under starting, or emergency condition, an override can be provided coupling the trailing flank of the marker signal — occurring, for example, at upper dead-center position of the cylinder — to the output of the system to provide directly generated ignition pulses.

16 Claims, 15 Drawing Figures

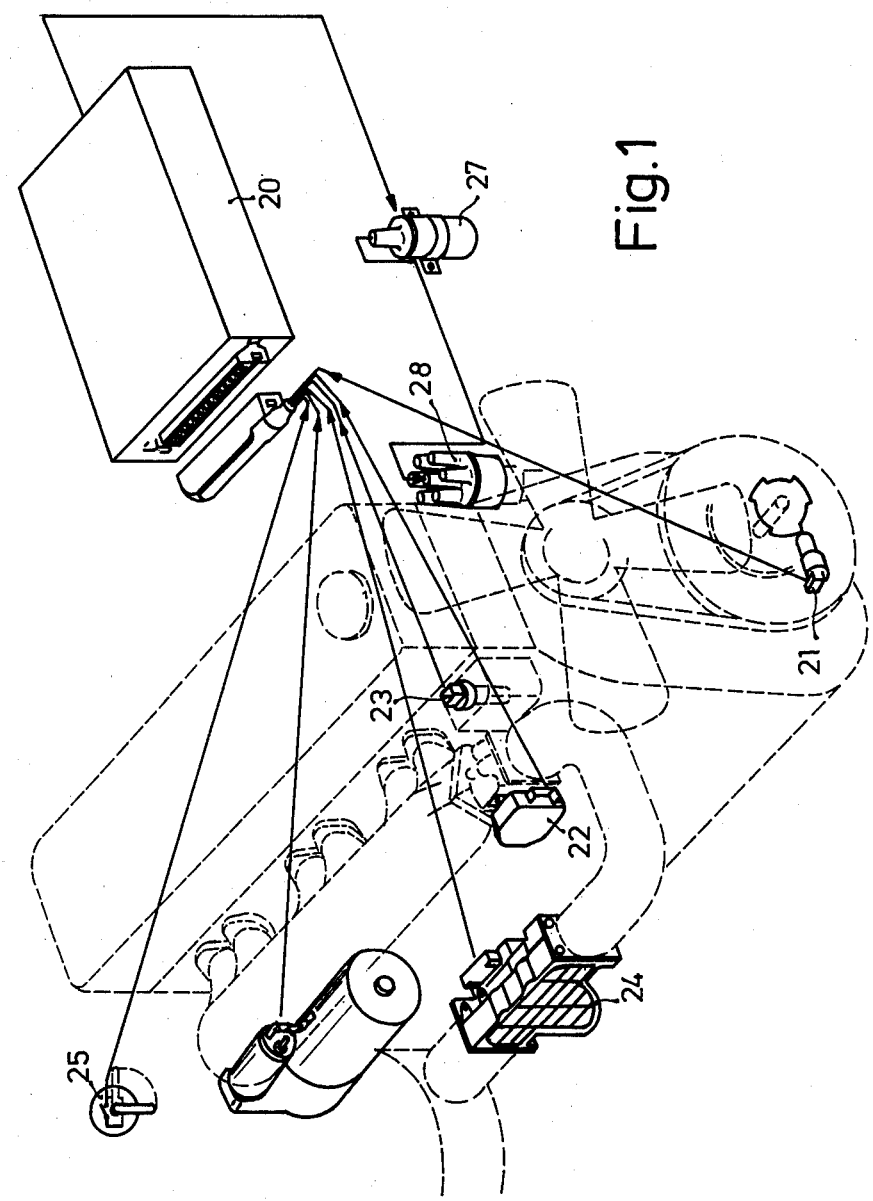

METHOD AND APPARATUS TO DETERMINE THE TIMING OF A PERIODICALLY REPETITIVE EVENT WITH RESPECT TO THE POSITION OF A ROTATING BODY, AND MORE PARTICULARLY IGNITION TIMING, FUEL INJECTION TIMING, AND THE LIKE, IN AUTOMOTIVE INTERNAL COMBUSTION ENGINES

Cross reference to related patents and applications:
U.S. Pat. No. 3,898,972, HAUBNER
U.S. Pat. No. 3,923,021, STARK
U.S. Ser. No. 509,846, ACKERMANN et al, now Pat. No. 3,930,201
U.S. Pat. No. 3,903,857, HONIG et al
U.S. Ser. No. 557,014, RIESENBERG et al, now Pat. No. 3,949,252
U.S. Pat. No. 3,874,351, ADLER et al
U.S. Ser. No. 461,527, SCHOLL
U.S. Ser. No. 480,581, HAUBNER et al, now Pat. No. 3,951,122
U.S. Ser. No. 491,047, LINSTEDT et al, now Pat. No. 3,949,722
U.S. Ser. No. 587,627, WAHL, now Pat. No. 4,015,566
U.S. Ser. No. 650,971, GORILLE et al The present invention relates to a method to determine the relative timing of a periodically repetitive event in dependence on the instantaneous position of a rotating body, and more particularly timing of ignition events with respect to the angular position of the crankshaft of an externally ignited internal combustion engine, timing of fuel injection pulses or control of other parameters occurring in the operation of internal combustion engines, and to apparatus to carry out the method.

It is important to provide exact determination of the timing of the ignition event in internal combustion engines with respect to angular position of the crankshaft and hence of the respective pistons in the cylinders. Power output, as well as the specific composition of the exhaust gases are affected by ignition timing. Optimum operating conditions therefore require that the ignition instant is precisely determined with respect to the operation of the engine. The primary parameters which influence ignition timing are engine speed and engine loading, once the engine is at normal operating temperature. As the speed increases, the ignition timing should change towards advance; at low speeds, the ignition timing is retarded — with respect o upper dead center (UDC) position of the piston in the cylinder. Under starting conditions, and before the internal combustion (IC) engine has reached its normal operating temperature, it is desirable to retard ignition timing to provide for rapid heating of the IC engine to operating temperature. When normal operating temperature is reached, the effect of additional rise in temperature becomes undesirable, and changing of ignition timing with respect to temperature should be inhibited.

It has previously been proposed to generate two separate pulse trains and to add the pulses until a predetermined value is reached in order to then trigger an ignition pulse. A transducer disk, coupled to the crankshaft of the engine, is supplied with a star wheel. When a predetermined marker is sensed, pulses are added during a constant time interval. At the termination of the time interval, the state of the counter will have a value counted which is representative of speed. Starting from a further marker, teeth of the star wheel are counted until the counter has a predetermined end value appear therein. This predetermined terminal or end value will arise at a time which is dependent on the number representing speed and, if the speed increases, the end or terminal value will occur earlier. If the timing interval of the first count cycle is fixed, speed dependency of the output result is provided automatically. The remaining operating parameters then can be considered by changing the final or terminal count value to which the counter is set, or controlled, when issuing the trigger or ignition pulse.

The result of the count of the system described is the generation of a pulse at a time which corresponds to an angular position of the crankshaft at which the ignition event occurs. A further signal is needed to control the ignition coil itself. To obtain this further signal it is additionally necessary to use electrical networks. Generating the pulses in synchronism with rotation of the crankshaft is difficult since the transducer required therefor is expensive due to the mechanical construction thereof. A star wheel is needed which is accurately machined to cooperate with a transducer element.

The ignition timing can be influenced only in a limited way, which forms a disadvantage of the system. Only three variables are possible: changing the fixed timing period for the first timing cycle; changing the tooth distribution for the second timing cycle; and changing the final terminal value of the count state to which the counter will count when it issues the ignition trigger signal. The trigger circuit itself can become complicated if it is to be applied to multi-cylinder internal combustion engines having high operating speed. The first counting cycle must occur during a short period of time which, additionally, decreases the possibility of varying this time, and hence to influence the ignition timing.

It is an object of the present invention to provide a system in which a trigger signal is provided to trigger an event depending on operating parameters of an operating device, and more specifically to trigger an ignition or fuel injection pulse for internal combustion engines. The output signal should have a predetermined angular relationship with respect to the angular position of the engine crankshaft. The system should, additionally, provide for substantial flexibility in use and be adaptable to be applied to various types of engines of multi-cylinder construction and having various speed characteristics.

Subject matter of the present invention: Briefly, digital values are formed within a certain range or interval of crankshaft angle and engine operation parameters which characterize the operation. These values, in subsequent intervals, determine the temporal relationship between crankshaft angle and timing of the event by counting. Calculation of the electrical numbers and their processing by counting them is carried out in overlapping intervals, but independently from each other.

The process and the system become particularly suitable for practical application when the periodically repetitive event is determined by a pulse voltage in which one flank of the pulse voltage is derived by counting of an electrical quantity starting from the edge of an angular range or interval; and the other flank is derived by counting a further electrical quantity starting from the first derived flank.

The input parameters and their processing time can be arranged with utmost flexibility. To provide such flexibility, it has been found advantageous to process at least two operating parameters in separate input circuits and to store the results; the calculation for counting of the required electrical parameters is then carried out in connection with further data which can be obtained, as needed, from a central memory or from a central processing unit.

The input values can be processed in an input circuit in time multiplex operation.

Special operating conditions may require change in the calculation or processing of the electrical values; the pulse sequence of a transducer measuring the angular range or interval may also be selected to provide the sequence of pulses. This has the advantage that, upon starting and before other parameters are provided, a pulse voltage is obtained; or, if portions of the system should fail, or fail to calculate properly, emergency operation is still possible.

In accordance with a feature of the invention, a data processing system is provided having a central processing unit, a control unit, a data exchange unit and suitable memories including working memories, as well as at least one input and one output unit; a disk is provided coupled to the shaft of the rotating body, if applied to an internal combustion engine to the crankshaft of the IC engine, and having markers thereon to form angular reference points with respect to the angular position of the shaft. Sensing elements connect the sensed shaft angle positions to the input unit. Data are processed in the system and the computed result is stored, in parallel, while additional permanently stored data can be provided for combination with the data derived from sensors coupled to the engine. The calculation being carried out then provides the desired timing relation of the output pulse with respect to angular crankshaft position.

In a preferred form, a data storage device provides control parameter quantities which contain information specific to the parameter and/or specific to the use to which the trigger pulse voltage is being put. Typical uses are, for example, to control an ignition event, and/or a fuel injection pulse. When combined with an IC engine, the data storage device typically will have stored therein data specific to the engine used, so that the data processing system can be independent of the type and design of the IC engine and can be applied universally. For universal application of the system it is additionally desirable to so convert the operating parameters, when applied to the system, that a suitably selected electrical parameter is derived, for example frequency, duty cycle or repetition rate, or a combination of both. This has the advantage that the transducer used in any engine system need not be of a specific type providing an output of a very specific nature. Transducers which are suitable may, for example, be star wheels with additional markers for specific angles associated with the crankshaft of the engine, besides angular range transducers.

A suitable compromise between accuracy and processing time for computation can be obtained by processing the data at two different clock frequencies. When using two different clock frequencies, speed data can be processed at a lower clock rate than the processing of load-dependent parameters, since the accuracy of ignition timing, with respect to angular crankshaft position, need not be as high with respect to load-related data as with respect to speed-related data.

The system has the specific advantage that a pulse voltage to control an event can be readily obtained while still providing utmost flexibility and the opportunity to modify the output in accordance with a large number of input parameters. The structure and the system are also particularly suitable for construction as an integrated circuit with universal applicability, since they lend themselves to combination with external memories so that a single processing unit or system can be used with many types of vehicles and engines to provide ignition or fuel injection pulses.

The system will be described as applied to control ignition timing of automotive-type IC engines. The data processing system as such is a separate structure which has been frequently treated in the literature. Thus, the actual operation of the data processing structure and of the central processing unit will not be described in detail, except insofar as is necessary to point out specific requirements for the specific application in connection with the present invention. With respect to the data processing system, reference is made to general literature in the field. The data processing elements of the present invention are described therein and the system is in general based on the general discussions there provided: "Designing Microprocessors with Standard Logic Devices", Part 1 and 2, "Electronics", Jan. 23, 1975, pages 90–107; Bell and Newell: "Computer Structures", McGraw-Hill, 1971; and Davis: "Introduction to Electronic Computers", Mc Graw-Hill, 1971.

The invention will be described by way of example with reference to the accompanying drawings, wherein:

FIG. 1 is a general illustration of the system applied to an automotive internal combustion engine;

Figure 2A:
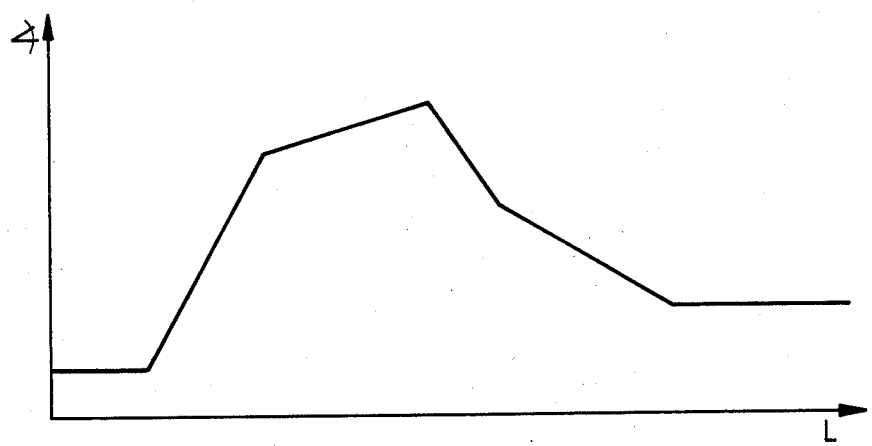
FIG. 2a is a graph of ignition timing angle (ordinate) with respect to load (abscissa)

FIG. 1 illustrates the general arrangement of the system in connection with an IC engine. The processing unit requires a number of operating, environmental and ambient parameters and provides output signals which, directly or indirectly, can control load associated with the engine. The specific load here involved is the ignition coil. The universal applicability of the apparatus is such, however, that it should also be possible to obtain output signals for fuel injection valves. The apparatus and system thus include a computation system 20 to control ignition coil 27. It has the following parameters applied thereto: speed, load, temperature, quantity of air applied to the engine, and an input control signal, for example derived from the starting switch of the vehicle. Computer apparatus 20 is connected to a speed transducer 21, a throttle switch 22, a temperature sensor 23, inlet airflow meter 24 and starter switch 25. The data derived from the various sensors are processed in system 20 and provide an output signal for ignition coil 27. Ignition coil 27 is connected to a distributor 28 which, in turn, is connected to the spark plugs of the engine, as customary and standard in the art. The data representing the parameters should be applied to the input of the system 20 in such a way that their inputs can be derived from various types of transducers, so that system 20 is not limited for use with any particular construction of transducer. FIG. 1 illustrates a speed transducer in the form of a segmental transducer in which three segments of 60°, each, are separated by 60°-depressions. Such a transducer thus can provide angular information and, as a derived quantity, can also provide speed information. The trailing flank of a segment is preferably so placed that it corresponds to a proper ignition angle for starting. Thus, upon starting, the output signal of the segmental transducer can be used as the control signal for the ignition coil, in which the pulse triggered by the change in configuration of the disk forming the segmental transducer, by the leading edge of the projecting segment, triggers a pulse to close the circuit through the ignition coil.

Segmental transducers have the advantage with respect to star wheel transducers that they provide an angular reference signal. Star wheel transducers require additional markers as reference points for an ignition angle.

Besides speed, the second important parameter to control an IC engine is loading. Various parameters can be sensed to obtain a signal representative of loading: position of the throttle; pressure (or, rather, vacuum) in the inlet manifold, or the quotient of induced air quantity divided by engine speed. If the IC engine uses fuel injection, then the latter selection of transducers to obtain a signal representative of loading is particularly appropriate since an air mass flow meter is usually present in order to determine the quantity of fuel to be injected so that the exhaust gases from the engine will have a minimum of noxious components.

Engine temperature is another parameter which is used to change the ignition angle characteristics upon warm-up of the engine. Setting the ignition angle for retarded ignition results in rapid heating of the exhaust system, which can be used to pre-heat the air induction system of the engine, or to rapidly raise the operating temperature of exhaust gas catalytic systems. Various separate and preset temperature threshold levels are preferably used.

The idling condition of an IC engine is particularly critical operating state. The engine must continue to idle even if some loads are applied thereto, for example an automatic transmission which has some creep. The engine must not stall, even though the throttle is not operated, but rather must continue to operate stably at idling speed. Additionally, control of the exhaust components upon idling is particularly critical. A switching signal, derived from throttle position, can thus be used to indicate that the engine is idling and to characterize that critical operating state which can then be considered when calculating the ignition timing by basing ignition timing setting on a changed engine characteristic.

The ignition timing as theoretically and optimally calculated by system 20 should, preferably, be capable of being overridden under certain operating conditions, such as:

(a) upon starting, and when the various parameters above considered may still be subject to transients and the output signals may have severe noise components;

(b) upon drop of the on-board vehicle voltage to a minimum value for proper operation of the computation system 20;

(c) upon discovery of erroneous operation of the ignition system computer 20, or in one or more of the transducers, as monitored and supervised by an additional monitoring and supervisory system.

If any one of these emergency or transient states is sensed, an override will be used to control ignition timing and current flow through coil 27 switched on with the leading edge of the segmental transducer 21 and switched off with the trailing flank.

Figure 2B:
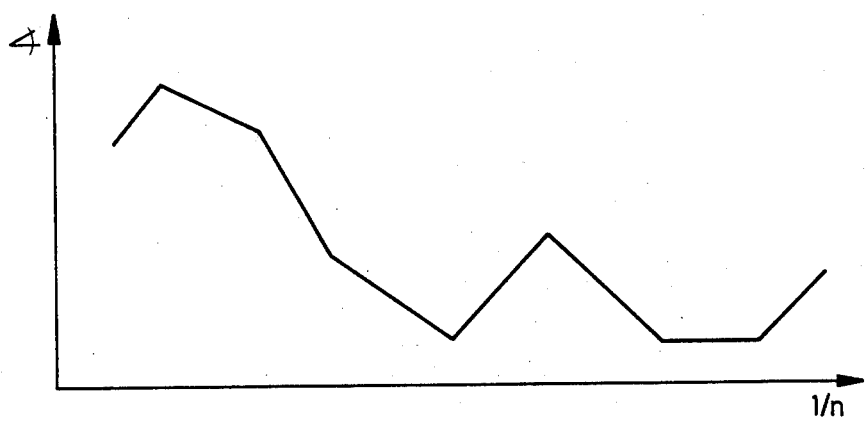
FIG. 2b shows the dependence on ignition angle timing (ordinate) with respect to the inverse (reciprocal) of speed.
Figure 3:
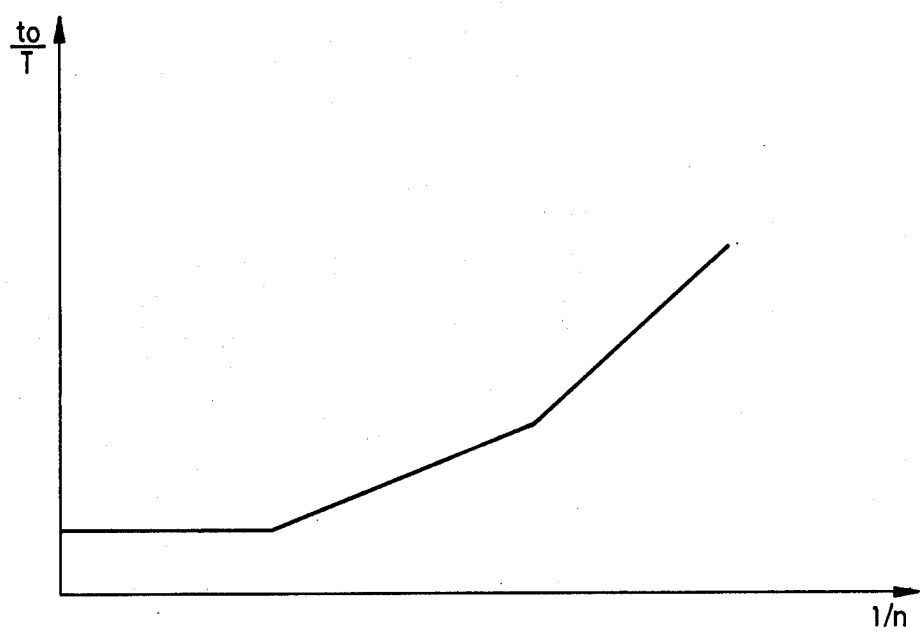
FIG. 3 is a graph of the time of current flow of ignition current through the ignition coil of an internal combustion engine, in percent (ordinate) with respect to the reciprocal of engine speed.

The curves of FIGS. 2a, 2b and 3 illustrate the operation of the system and the effect of ignition timing. FIGS. 2a and 2b show the curves as straight lines throughout specified intervals, in which the straight portions have different slopes. These curves are specific to a certain type of engine and are derived experimentally by considering optimum efficiency of operation of the engine. The subdivisions into the straight segmental portions are compromises of illustration, in the graph as shown in the drawings as well as in the actual characteristic of the engine itself. The ignition angle is referred to the upper dead center (UDC) position of the piston in the cylinder.

The output signal of the control device is a square wave having a predetermined pulse duration and a predetermined repetition rate. The pulse duration corresponds to the closed or ON-time of the ignition coil, and the difference of repetition or periodic duration and pulse duration represent the open or OFF-time. To provide an ignition spark rich in energy, an On-time is required which is selected from three time constants based on coil inductance and coil resistance. On the other hand, a sufficient OFF-time is required to permit sufficient time for the spark at the spark plug to arc over. At high engine speeds, the OFF-time of the ignition coil must be sufficiently long to permit sparking at the spark plug so that a constant OFF-time must be provided regardless of the ON-time, so that the minimum sparking period is not passed. The portion of the OFF-time with respect to the ignition repetition rate versus the reciprocal of speed is illustrated in FIG. 3. At low speeds, the transducer can provide direct ignition control signals, that is, the ON-time of current flow through the ignition coil corresponds to a 60° angular segment. Thus, there is proportionality between normalized ON-time and the reciprocal of speed. As the speed increases, the normalized OFF-time decreases, providing a constant ON-time. From 3000 rpm until 4500 rpm ON-time as well as OFF-time are continuously decreasing. Above 4500 rpm, control of current flow through the ignition coil is carried out with constant OFF-time. This OFF-time can be selected for different types of engines and, for a typical four-cylinder IC engine, is between 100 microseconds to 2 milliseconds.

The system should, preferably, be universally useful and, to provide for such universal utility, the two speed thresholds can be separately selected, so that the speed threshold at which transition occurs from the angle of the transducer to reduction in closing time and the second speed threshold at which a constant OFF-time is selected, can be individually preset in individual systems 20.

Three timing constants determine the ON-time in the range between idling speed and about 3300 rpm. At the lowest speeds, a longer ON-time is deliberately not selected so that the ignition coil will not heat excessively due to current flow therethrough. A quiescent current disconnect is also provided in order to ensure against excessive heating of the ignition coil and to prevent discharge of the battery when the engine is stopped; such a quiescent current disconnect may be programmed to occur, for example, at a very low speed at, for example, 20 rpm.

Figure 4:
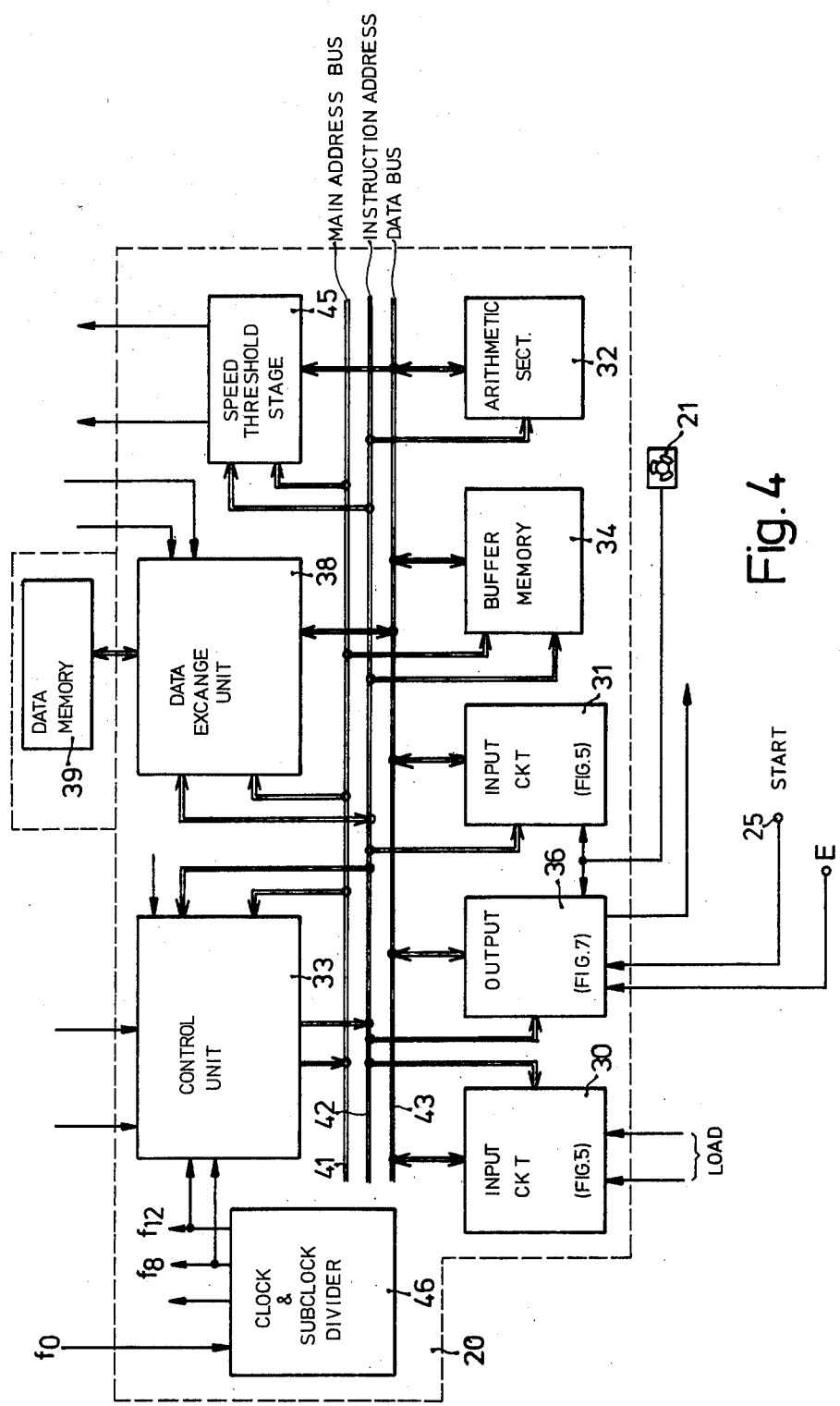
FIG. 4 is a general schematic diagram of the computational structure of the system of the present invention.

The computation system 20, basically, has four functional blocks, as illustrated in FIG. 4 to which reference is made:

(1) Input data are converted into binary numbers and stored in input units 30 and 31 forming, for example, generally input coupling units responding to input pulses;
(2) a central processor having an arithmetic unit 32, a control unit 33 and a buffer memory 34;
(3) an output unit 36 to form output pulses; and
(4) a data exchange unit 38 to receive data from an external memory 39.

The system uses three basic bus systems: a main address bus 41, an instruction address bus 42 and a data bus 43.

The main address bus 41 — and in this context the term "bus" relates, of course, to a bus system as well known, - is concerned with macro-processing, that is, processing of load and speed data, determination and formation of speed thresholds, counting of energization or de-energization time, including arithmetic re-calculation and consideration of corrections; the instruction address bus 42 carries out micro-processing of the respective data and determines storage and re-storage, as well as the operating sequences; the data bus 43 carries the internally shifted or transferred data between the various memories and control circuits. The three bus systems 41, 43 are, in accordance with their function, connected to the various functional blocks.

A speed threshold stage 45 is provided to determine the respective speed thresholds; and a clock and subclock divider 46 provides clock frequencies and subclock frequencies.

Figure 5:
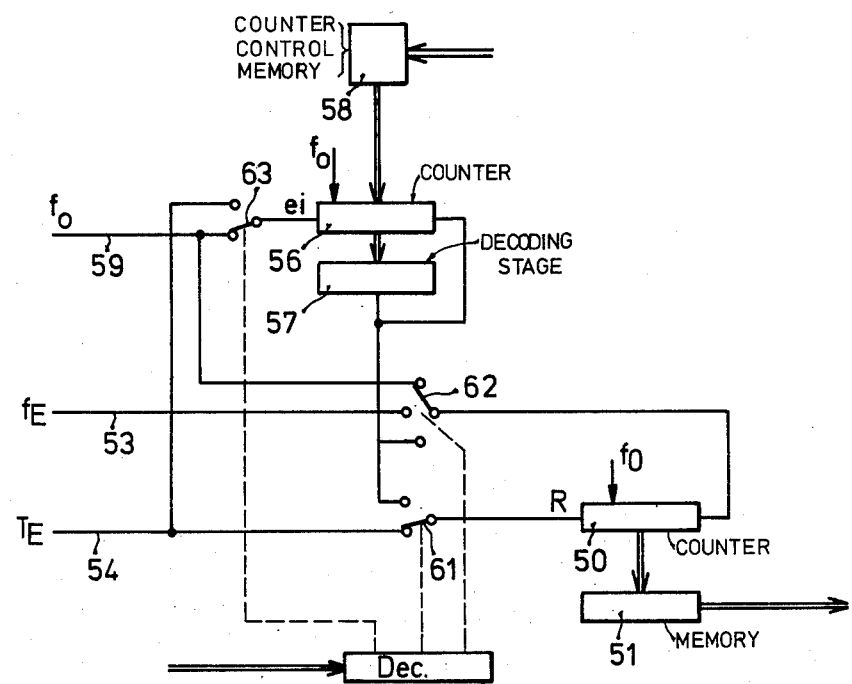
FIG. 5 is a schematic diagram of a standard input circuit.

Data Preparation — Input Circuits 30, 31, FIG. 5:

Speed as well as load information can be provided by the circuit of FIG. 5. The essential component thereof is a counter 50 connected to a memory 51 which provides the output signal, in digital form, and ready to be read out when addressed. As above discussed, the input circuit should be as universally applicable as possible. The input parameter, therefore, applied to an input terminal 53 may be a signal having a predetermined frequency. Further, an input signal having a predetermined ON-time with respect to OFF-durations can be provided at terminal 54. It is additionally desirable to permit frequency division or frequency multiplication. This can be obtained by means of a further counter 56 and a count state decoding stage 57. The division ratio of the divider combination can be determined in dependence on the start value and the final value of the counter. These start and final values can be predetermined and introduced from a counter control memory 58. A further parameter is needed, namely a basic clock frequency which, in the present instance, is provided by the basic clock for the system schematically indicated by arrow $f_O$. This basic frequency is available at line 59.

The reset inputs, as well as the count input of counters 50, 56 can be, selectively, connected as desired and in dependence on the nature of the input signal to be processed, that is, whether it is to be a frequency or an ON-time, for example. The basic counting frequency is the base clock frequency $f_O$. Frequency division is particularly advisable if the the possibility to process the transducer signal directly is limited. If, for example, the ignition should respond to an accuracy of rotation of one degree of crankshaft angle and the transducer is capable of resolving only 3° of crankshaft angle, then inaccuracies can be at least partially compensated - although not completely so.

The selection of the input signal or, respectively, the division or multiplication of the input frequencies is carried out by the decoding stage which, selectively, resets the reset inputs and the count-ready inputs of the counters 50 and 56 through switches 61, 62, 63 as selected.

The input circuit of FIG. 5 has the specific advantage that it is universally useful since frequencies as well as ON-times of input signals can be processed and stored in a memory in digital form. The transduced value must, of course, already be available in digital form, either as a frequency or as an ON-time. Since the system to be described has high accuracy, analog transducers are not recommended because they are usually more subject to noise and disturbance signals, malfunction, and their output signals are temperature-dependent.

The counter may operate with different count frequencies, depending on the accuracy of the output signal which is wanted. This is especially desirable if the counters include shift registers and read-out from memory 51 is carried out serially. One has to make a compromise between accuracy and use of components. The present case, therefore, provides means to sense parameters relative to speed at one twelfth of the base frequency, and to sense parameters depending on load with one eighth of the base frequency. Speed information must be resolved to a more accurate or higher degree so that 12-bit registers are needed; load information can be resolved with respect to 8-bits. This is illustrated in connection with the operation of the memory 51. If this memory 51 has an 8-bit arrangement, and recirculation is carried out at a base frequency $f_O$, then the output can be read out once for each 8th clock. If, however, a 12-bit arrangement is used, read-out can be terminated only after 12 clock signals. As a result, the corresponding value is available only after the respective number of base clock pulses have been counted out.

Figure 6:
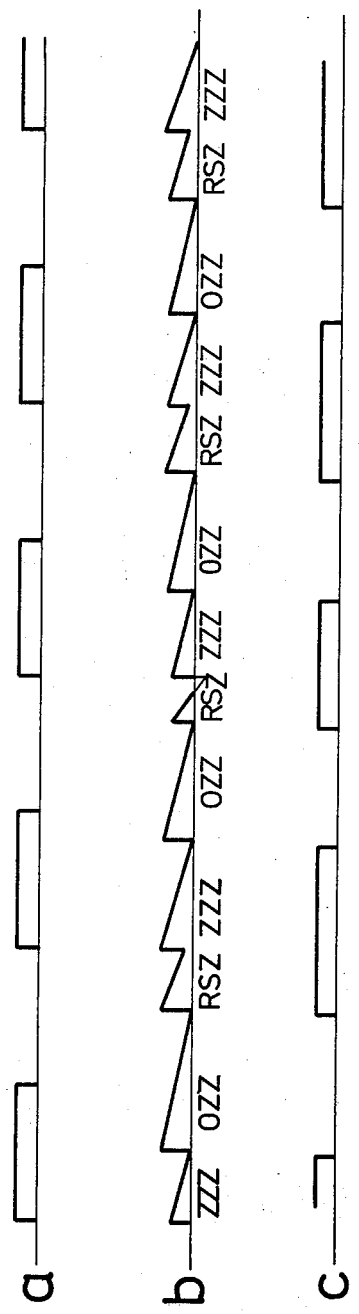
FIG. 6 is a timing diagram showing the counting sequences of the output circuit.

The output signal, as illustrated in FIG. 6, graph c, is a square wave which occurs with respect to a certain angular position of the crankshaft. Graph a of FIG. 6 illustrates the output signal from a 60° segmental transducer operating in synchronism with the crankshaft.

As seen in graph b of FIG. 6, three counting cycles occur during each period of the signal derived from the segmental transducer. Graph c of FIG. 6 illustrates the output signal of circuit 36 (FIG. 4). The graph labelled ZZZ indicates the determination of the ignition instant; the graph OZZ indicates the determination of the OFF-time during which no current flows through the ignition coil, and the graph RSZ indicates the determination of the quiescent current.

Ordinarily, the determination of the ignition instant is calculated upon occurrence of the leading flank of the transducer signal, as seen in FIG. 6, graph a. When the ignition timing counting has reached a predetermined value, in the present example the zero count value, the ignition timing instant is determined and, as a next sequence, the OFF-time of current for the ignition is counted. After the OFF-time has been determined, a further value is calculated to determine duration of the ON-time or the turn-off of quiescent current. If, after termination of the OFF-time counting, a new value is set into a down-counter, then the count state will be speed-dependent, if the counting frequency is constant, and when the next leading or rising flank of the transducer signal occurs — see FIG. 6, graph a. If the count state, for example, is greater than zero or null when the rising flank occurs, then the speed can be considered to be still sufficient and no quiescent current turn-off is necessary. If, however, the count state is smaller than zero, that is, is negative, then the speed can be considered as insufficient and ignition current is interrupted. The specific speed at which time ignition current, that is, quiescent current is interrupted can be determined, therefore, by counting frequency and, further, by determining the initial value to which the counter is set when carrying out the quiescent current counting steps.

The pulse duration of the output signal, FIG. 6, graph c, terminates when the ignition time counting phase terminates, and begins with the termination of the open time counting. During the time when the termination of the pulse duration is counted, starting from the rising flank of the transducer pulse, graph a of FIG. 6, the beginning of the subsequent pulse, in accordance with graph c, is counted starting from the termination of the preceding pulse duration. Since the signal of graph c is identical to current flow through the ignition coil, the end of the ON-time, and thus the ignition timing at which the spark is generated or, in other words, the ignition angle with respect to crankshaft angle, will be related to the pulse derived from the segmental transducer, as shown in the graph a. Thus, the ignition instant and crankshaft angle are properly related.

Quiescent current interruption by counting, as illustrated in graph b of FIG. 6, in which a negative count state causes interruption of current through the ignition coil, is itself inhibited only if there is no occurrence of a negative count state after the synchronization marker - in the example illustrated the rising flank of the transducer signal — has not occurred twice in succession.

The signal of graph c of FIG. 6 thus requires three inputs which must be provided to a counter in proper sequential arrangement. The ignition timing, the open period and the quiescent current-disconnect are all considered by the counter.

Figure 7:
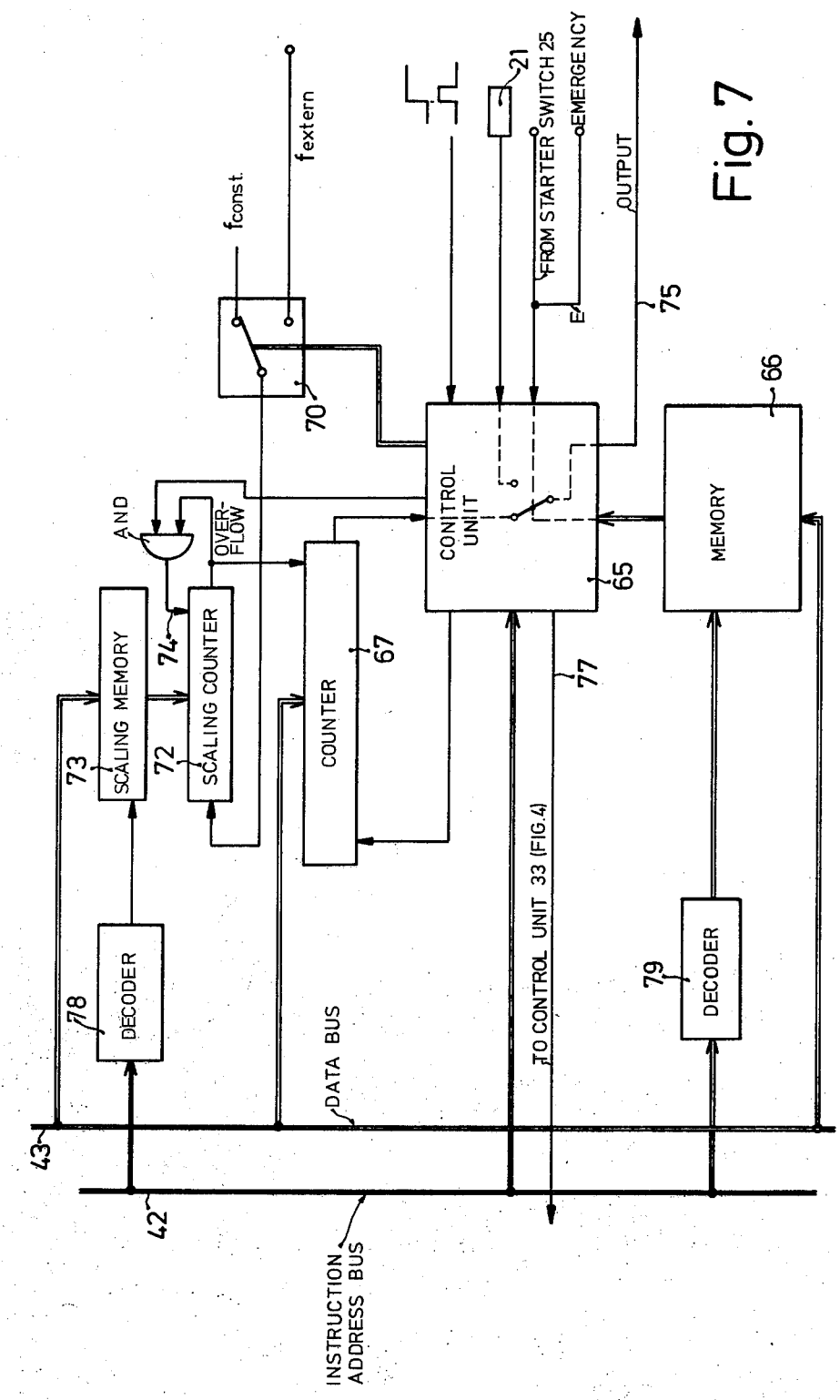
FIG. 7 is a schematic block diagram of an output circuit.

Output circuit 36, with reference to FIG. 7:

A control unit 65 is connected to a memory 66 to fix the cycling sequence. A counter 67 is provided to count the ignition timing as well as the ignition open-time period and to determine disconnection of quiescent current. A transfer switch 70 is provided for the counting frequency which is fixed if a segmental transducer is used, but which is angle-dependent if a star wheel speed transducer is used. A buffer memory 73 contains a scaling factor to control a scaling counter 72.

To count ignition timing, counter 67 is first loaded with the value determined in the computing system. The counting frequency of counter 67 depends upon the type of transducer, that is, if a segmental type of transducer is used or if a star wheel transducer is used. Assuming a segmental-type transducer, counting is carried out at constant frequency which is scaled by the scaling counter 72 in dependence on the respective requirements of the vehicle or the system. If a star wheel transducer is used, angular pulses are recommended which, if necessary, can also be frequency-divided. Dependent on the type of transducer, the ignition timing can thus be determined either with respect to angle or with respect to time, so that the respective corresponding counting frequency can be used.

If the counting state in counter 67 reaches a predetermined value, for example zero, then the output signal at the output line 75 is likewise set to zero by the control unit 65. Simultaneously, counter 67 is loaded to a value determining the OFF-time of the coil and counted out, as above described. Thereafter, and after termination of counting of the OFF-time, the counting cycle for the quiescent current disconnect is carried out. The counter 67 is again counted down with a small counting frequency from a value which is derived from a maximum value of the count state of the scaling counter 72. The scaling memory 73 which determines the respective initial value for the scaling counter 72 upon downcounting of the ignition timing and the OFF-timing, or of the respective angular counts, and thereby determine the scaling ratio, is not used during the count-down of the quiescent current disconnect timing. Rather, an AND-gate logic circuit is used connected in advance of the loading input 74 of the scaling counter 72 to which overflow pulses from the scaling counter 72, as well as pulses from the control unit are applied.

The control unit 65 has inputs for the output of the segmental transducer or for other markers which determine the beginning of the counting cycle; additionally, it has an input to which a signal is applied which occurs during starting, for example derived from the starting switch 25 of the vehicle, and which directly applies the signal from the segmental transducer to the output line 75. A situation similar to starting situation is that for operation under emergency conditions. The system may have additional sensing elements which provide, with fail-safe connection, an output signal indicative that any one of the calculating or mathematical operations have failed, or that the transducer in the system does not provide proper outputs. Such signal can be applied to an "emergency" bus E which, similar to the starting signal, causes switching of the ignition output control line 75 directly to the transducer 21. The generation of an emergency program will be described when the entire computation cycle is discussed below.

Figure 8:
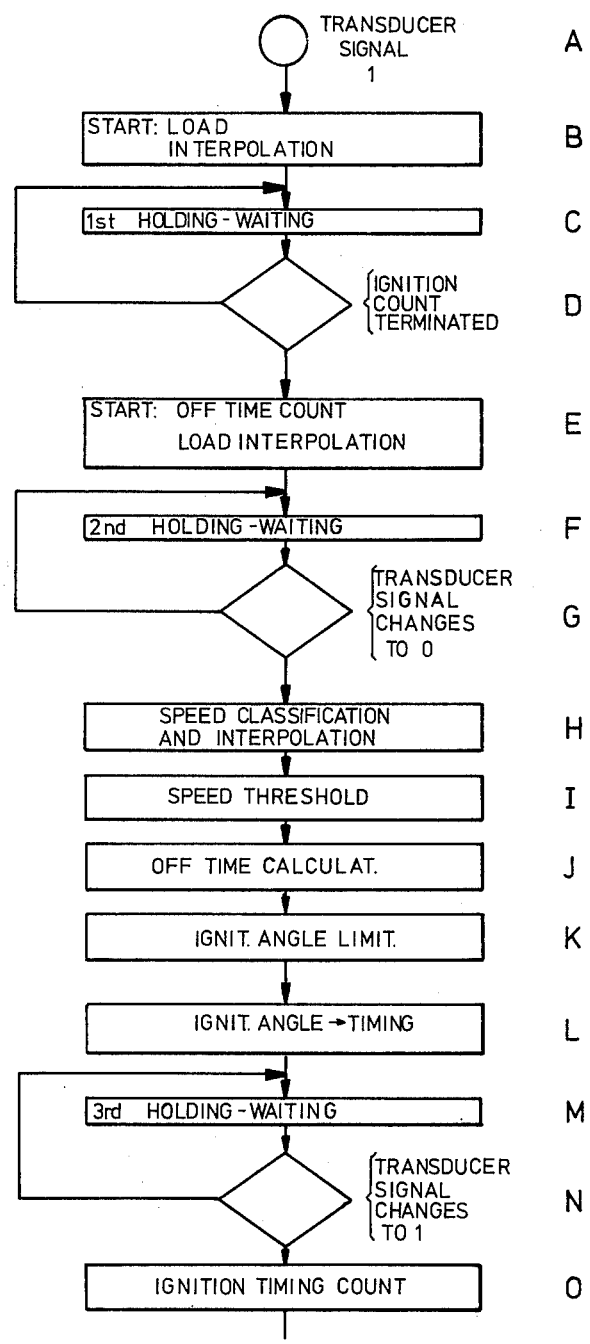
FIG. 8 is a flow diagram showing determination of the control signals for the ignition signal end stage.

A feedback or notification line is provided to permit the control unit 33 (FIG. 4) to be informed that the ignition timing is carried out under emergy condition, or otherwise not under control of the computation system, for example due to the operation of the starter switch. Thus, the presence of operation under such special conditions is notified over line 77 from control unit 65 of the output unit 36 to the control unit 33 of the overall system. Blocks 78, 79 are address decoders to load the memory 66 and the scanning memory 73 with values from the external memory at special address combinations on address-bus. A flow diagram for the calculation sequence is illustrated in FIG. 8. This flow diagram is directed to a signal derived from a segmental-type transducer. At time A the signal from the segmental transducer and also at the output line 75 (FIG. 7) is assumed to be a binary 1. During Time B the partial loading interval for interpolation is determined, as well as data exchange for the initial setting of the partial loading. C indicates a holding or waiting period. When the ignition time counting is terminated - at D - the ON-time counting determined by E is started. The partial loading interpolation and the data exchange for the first full loading interval are also started. A further waiting or holding time F is provided until the end of the pulse period from the transducer occurs, as indicated by G. H indicates the full-load interval determination as well as full-load interpolation. I determines the two speed thresholds set in accordance with a desired external processing. J determines the calculation of the OFF-time, K limitation of the ignition angle or, rather, to prevent too rapid a change of ignition timing, to prevent bucking of the engine and the vehicle, and L transformation by calculation of the ignition angle to ignition timing. Thereafter, a third holding or waiting position M is provided during which the system waits for the occurrence of the next rising flank of the segmental transducer, which occurs at N. Ignition timing is then again counted in O and thus the initial position of A is again reached to permit interpolation of the partial-load interval determination as well as the data exchange in connection therewith and the holding-waiting period (items B and C), the ignition timing count of O being terminated again at item D.

Figure 9:
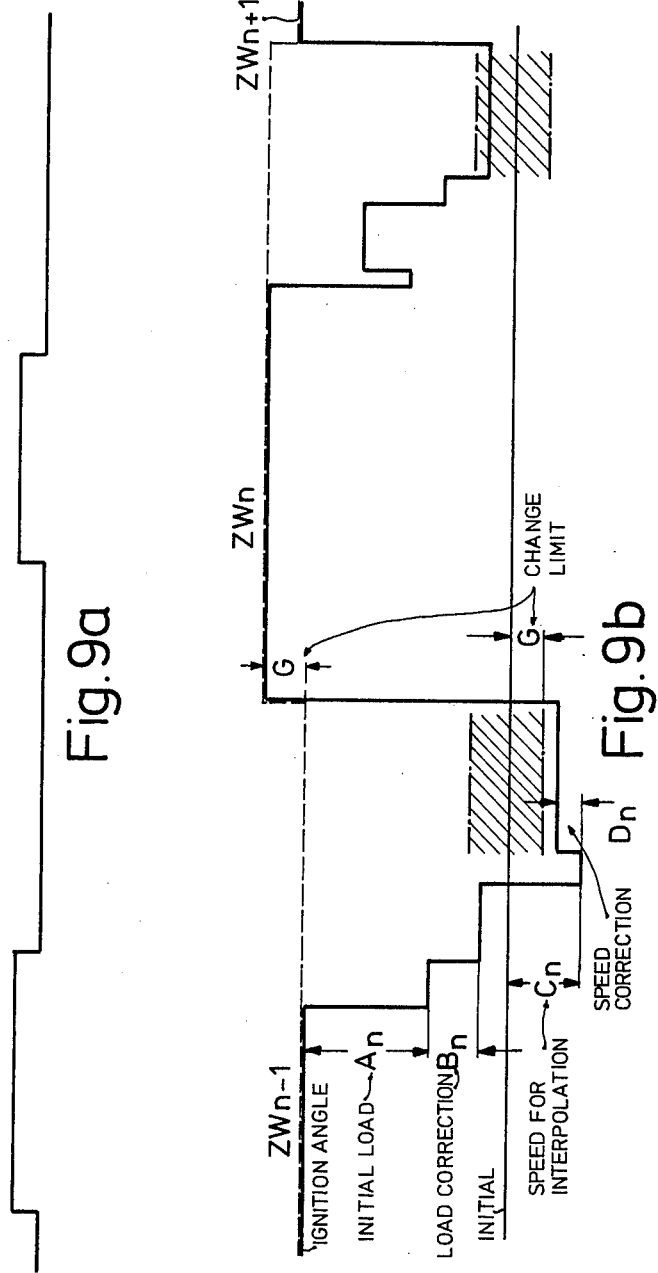
FIG. 9a is a diagram illustrating the output signal of a segmental-type transducer.
FIG. 9b is a timing diagram illustrating the timing of the computational steps to form a new ignition angle.

The occurrence of the changes is clear when considering the diagrams of FIGS. 9a and 9b. FIG. 9a shows the changes in transducer signal between a binary 1 and a binary 0 - which changes occur at points G and N of FIG. 8. FIG. 9b illustrates the timing of the various computational steps. ZWn-1 illustrates the ignition angle from the n-1 counting cycle. An is the initial value of the load; Bn is the linear correction value derived from the load interpolation; Cn is an initial value for speed interpolation. A linear correction value for the speed derived from the speed interpolation, Dn, is then added. The maximum change for ignition angle timing is shown at G, and recognized as such. In case the difference between the new and the old angle is greater than G, This maximum change in ignition angle is added, as shown in FIG. 9b, to the ignition angle from the preceding cycle, and the calculation starts anew for the next cycle n. The calculation is carried out only with respect to change in ignition angle with respect to the preceding ignition angle. Depending on the type of speed transducer, this ignition angle can then be used directly for calculation of a trigger signal; it is, however, necessary to convert ignition angle to ignition time — see step L, FIG. 8 — if a segmental transducer is used.

Figure 10:
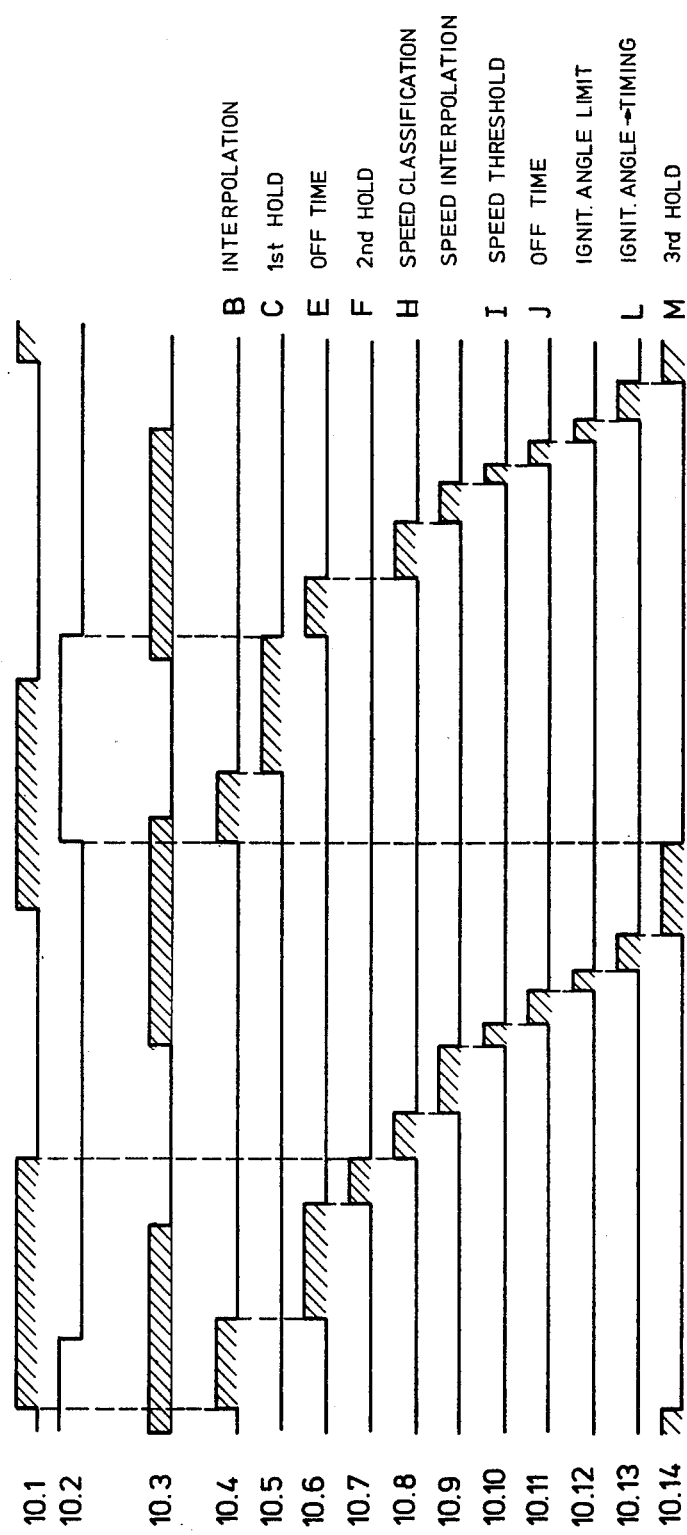
FIG. 10 is a sequence of timing curves illustrating temporal relationship of the various internal computation steps.

The internal calculation sequences are illustrated in FIG. 10. The counting steps occurring in the output circuit have not been shown therein. Overlaps occur between the illustration of FIGS. 8 and 10 and, therefore, letters have been used in FIG. 10, at the right side of the diagram, corresponding to the same steps of FIG. 8. FIG. 8 is to be deemed both a timing as well as flow diagram, the timing of the steps being indicated, as well as the flow of information through the system.

Referring now to FIG. 10: Graph 10.1 again shows the output signal of the segmental transducer, and corresponds to FIG. 9a. Graph 10.2 is the output signal on the output line 75, once for advanced ignition timing and once for retarded ignition timing. "Advance" and "retard" are here defined as the position of the trailing flank of the output signal on line 75 (graph 10.2) with respect to the trailing flank of the segmental transducer signal, graph 10.1. Under normal, ordinary conditions, the position of the trailing flank of the segmental-type transducer is also the ignition timing position under starting conditions - see discussion in connection with FIG. 7.

The load signal is illustrated in FIG. 10 in graph 10.3. The gating time is applied to the input of the corresponding input circuit 30 (FIG. 4). The load signal is processed in the input counter 50 and stored in the memory 51, FIG. 5, to be retrieved at any time. The graphs 10.4 to 10.14 correspond to the respective steps in the sequence illustrated in FIG. 8 and indicated by the respective letters at the right side of FIG. 10 and have been described in connection therewith.

The discussion of the internal sequence of calculation with respect to different ignition timing clearly shows that the determination of the interval number for the load distribution begins at a time when a pulse is present from the segmental transducer as well as an ignition pulse on the output line 75. Calculation of angle change due to loading is started after the ignition time is terminated. The remaining calculation steps then occur during the pauses or intervals of the signal from the segmental transducer. Holding loops are provided to match the calculation sequencing or timing to different speeds - the holding periods being physically instrumented by providing suitable short-term memories. The re-calculation of ignition angle to ignition timing necessarily must be finished upon the occurrence of the leading flank of the subsequent segmental transducer pulse.

Graphs 10.9 and 10.12 of FIG. 10 represent, respectively the phase of speed-angle interpolation and phase to correct the old ignition angle.

Figure 11:
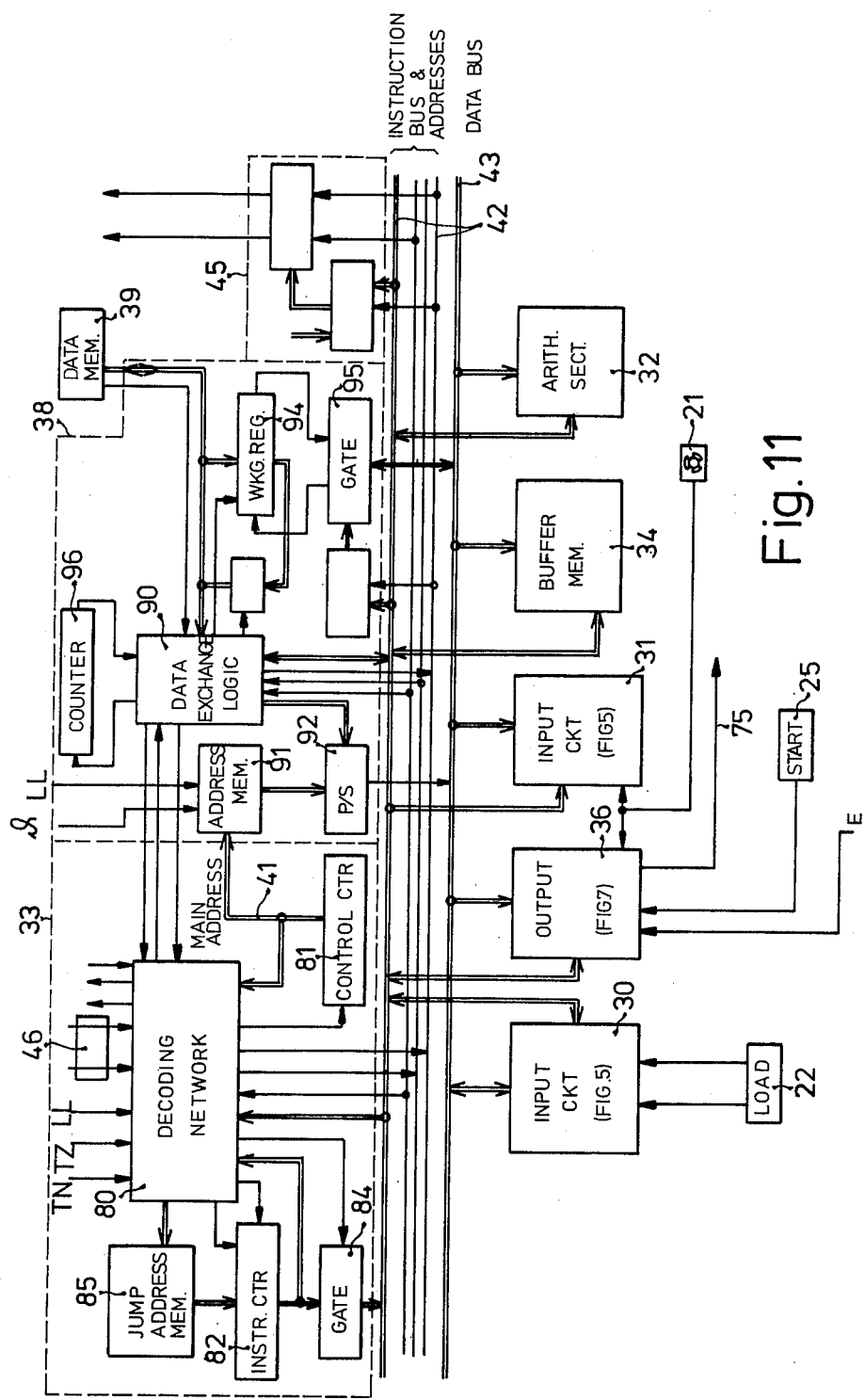
FIG. 11 is a detailed block diagram of the computer structure of FIG. 4.

The general diagram of FIG. 4 is shown, in more detailed form, in FIG. 11 to which reference will be made. Specifically, control unit 33, data exchange unit 38 and the speed threshold stages 45 will be described.

The control unit 33 has a decoding network 80 and a main control counter 81. The control counter 81 controls the main calculating operation, that is, ignition angle or ignition timing changes in dependence on speed and loading. An instruction or command counter 82 is provided for detailed operations during the processing of the data. The output from the instruction counter 82 is inhibited from application to the instruction bus 42 by a gate 84. The specific starting operation of the instruction counter 82 is determined by a memory for skip or jump addresses 82 in combination with the decoder 80 of the control unit. The decoder 80 receives information from the speed transducer over line TN, from the output line 75 with the ignition signal TZ, from the idling switch 22 on line LL, and a signal for special control, for example under emergency or other specific conditions. Additionally, the decoding network 80 has the usual clock and "housekeeping" signals applied thereto, as well as the data and instruction buses. The decoding network 80 is connected with the address and data exchange unit 38. The control counter 81 is connected to the main address bus 41, which bus 41 is connected to an address memory within the data exchange unit 38. The address memory has the idle signal from switch 22 applied thereto on line LL, as well as the temperature signal from transducer 23 on a line δ. The output signal from address memory 91 is connected to a parallel series (P/S) converter 92.

The data from the external memory 39 are transmitted in the form of data words to a working register 94 and are transmitted therefrom over a controllable gate 95 serially to the data bus 43. This flow of data can be reversed by connecting data from the data bus 43 for storage in the external memory 39. The internal program then must be suitably changed so that the data exchange, which is possible in two directions, does not interfere with the operations which are commanded by the instruction counter 82 within the main control unit 33. The data exchange is controlled by a separate data exchange counter 96 connected to the address and data exchange logic 90.

The arithmetic section forms two patterns of bits for the instruction bus 42 and for the main address bus 41. The first bit pattern determines the instruction or command with respect to the arithmetic operation to be carried out in the arithmetic section 32 (FIG. 4), for example addition, subtraction, and the like, and the registers to be used therefor are located within the buffer memory 34. The macro operations, as set forth in FIG. 8, consist of sequential micro commands which are transmitted to the arithmetic section 32 (FIG. 4). Let the interpolation step be used as an example for a series of micro operations: For loading as well as for speed, interpolation may be necessary and the same micro operations can be carried out; with respect to their macro operations, however, they differ since different parameters are sensed. To make this distinction, the signals on the main address bus 41 are provided to clearly associate a respective operation with the appropriate signal.

The ignition calculation system uses a plurality of registers in the buffer memory 34. Since data processing is carried out serially in the arithmetic section, the registers are constructed in the form of shift registers with recirculating lines for storage. They may, in part, be assembled of a small number of dynamic sub-registers to permit matching the register capacity of the word length during any one calculating cycle, that is, to permit matching the registers to words of eight bits, and twelve bits, respectively. The ignition in one of the registers must not be lost upon resetting of the clock generator, the output signal of which is synchronized with the rising flank of the segment transducer signal. The data exchange register should be a static register, since the data exchange is not carried out synchronously with the control functions. The remaining registers may, however, be dynamic registers since the construction of dynamic registers is more easily carried out by integrated circuits. The registers store the following data:

(a) address for external data memory to provide the necessary values for calculation;

(b) ignition angle calculated in the preceding calculating cycle, and intermediate values arising during the determination of the ignition angle, ignition current flow, and OFF-time determination; and (c) load-related value derived from the load sensing circuit 24 (FIG. 1).

The various arithmetic operations can be carried out in a 1-bit full adder with sign control.

The ignition calculating system is connected to the data memory 39 through an external data bus. The computer can be connected over this bus system to a central electronic control system or unit, in the form of a micro processor in which control for injection of fuel to the engine, as well as control of gear transmission switching changes is calcuated and the appropriate command signals derived. The information, whether data exchange is to be effected, is derived from the central control unit 33 over the instruction address bus 42 in connection with a decoding network.

Two 4-bit static shift registers are used for the actual data exchange; the shift registers of the type MM 54 C 95 by National Semiconductor are suitable. They, inherently, effect serial-parallel and parallel-series conversion. The external data memory 39 processes the information in blocks of four bits, each, whereas the arithmetic unit processes the data in serial form.

The system has a special program in the control network which forms a "start" and an "emergency" signal provided by a respective network. The emergency network provides an ignition control signal even if a portion of the processing network should fail, or if there should be malfunction. This network compares how often a marker of the speed transducer occurs without change of two fixed operation addresses. If this occurs more than twice, that is, if the comparison without change exceeds the number 2, then the output circuit 75 is directly connected with the segment transducer 21 - see FIG. 7 and discussion in connection therewith. This emergency operation is terminated after two full operating cycles. During this emergency control, all registers are set to initial values determined by data derived from the external memory 39. This portion increases the reliability of the circuit with respect to possibly occurring disturbances. Due to the multiple comparison, emergency operation will continue if a portion of the circuit should become disabled.

The ignition computer also has a base state. During this base state, all the registers - with the exception of the data exchanger register - receive their information by circulating the information therein. Each register has a circulating line, controllable over a suitable gate. This initial state is necessary for:

(1) matching the sequencing of control to the output signal of the speed transducer;
(2) matching the sequencing of control of the state of the ignition switching transistor;
(3) carrying out data exchange between the external memory and the arithmetic unit. The data exchange portion, in this case, takes over control of the instruction bus;
(4) matching the clock repetition upon transition from eight to twelve bits of the length of the word, and back from twelve to eight bits; and
(5) proper placement, in time, of additional clock pulses in order to eliminate problems with respect to propagation time.

Figure 12:
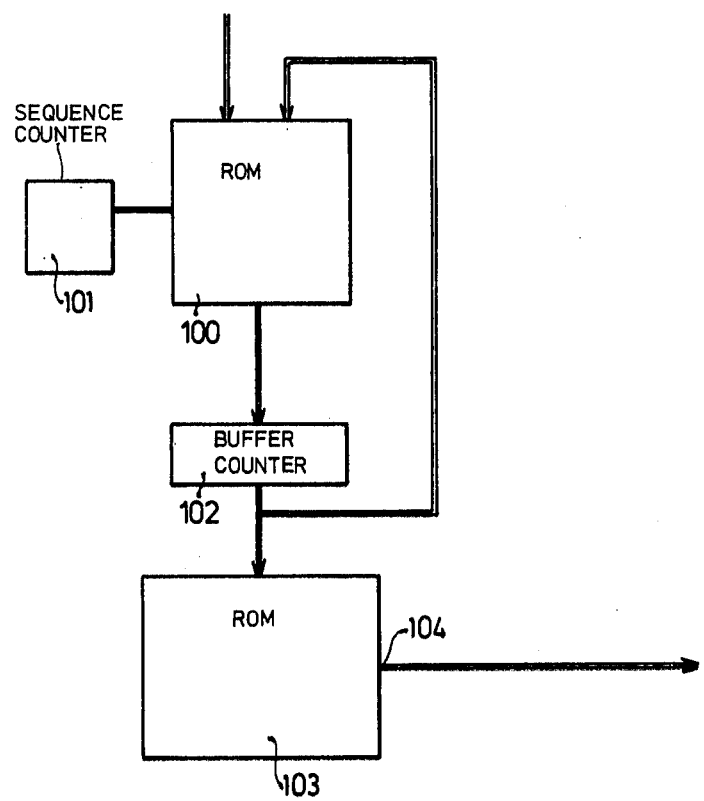
FIG. 12 is a schematic block diagram of a control unit.

The control network or control unit using memories is illustrated in detail in FIG. 12. A first read-only memory (ROM) 100 for subsequent addresses is controlled from a sequence counter 101, as well as from a feedback line of a buffer memory 102 connected to the ROM 100. The buffer counter 102 is connected to a further ROM 103 for operations, the output 104 of which is connected to the main address bus 41 as well as to the instruction bus 42 (FIG. 4). The solution of FIG. 4 is particularly suitable if a relatively large number of sub-programs, that is, repetitively occurring program sequences within a basic program, are not needed. In the embodiment of the control system as illustrated in FIG. 12, the sequence counter 101 addresses an address in the ROM 100, and the value stored therein is read out. This value is then used as an address for the ROM 103, the content of which corresponds to operations.

Figure 13:
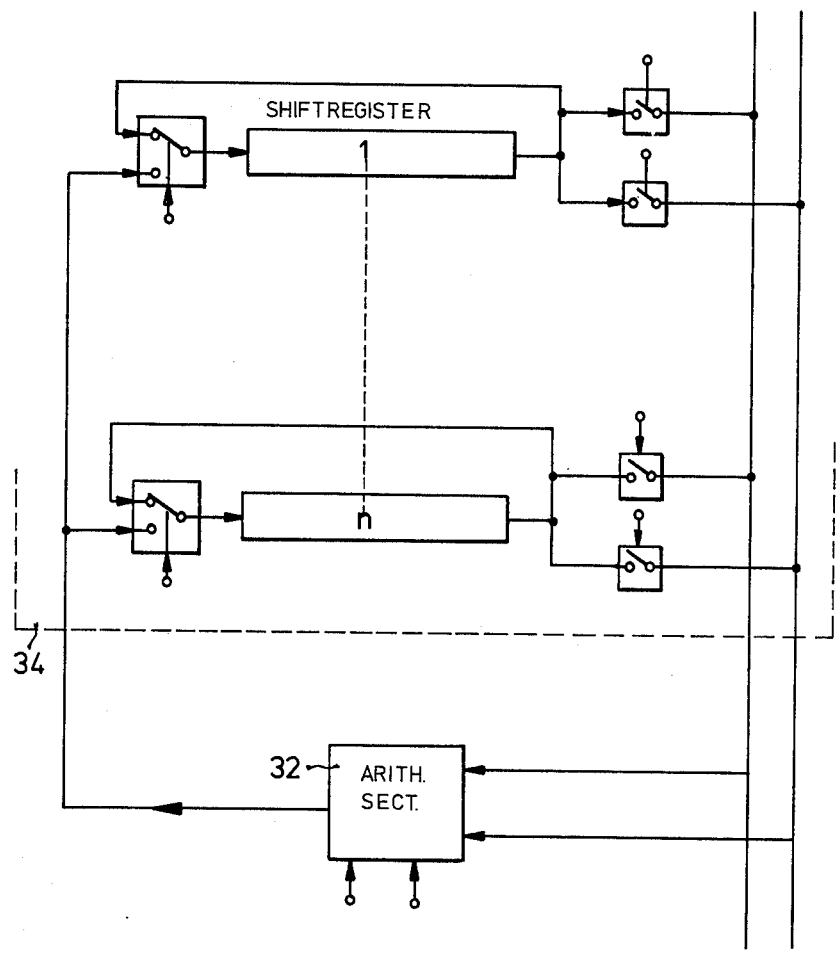
FIG. 13 is a schematic block diagram illustrating association of storage units with the central processing unit.

The arithmetic section 32 and the buffer memory 34 (FIG. 4) can be constructed as illustrated in FIG. 13. The buffer memory 34 includes n shift registers, the inputs of which can be selectively connected with the output of the arithmetic unit 32 or with the output of the respective registers, in order to provide a base or initial position. The outputs of the registers are in turn connected over the data bus to be connectable to one of the two inputs of the arithmetic section 32. The registers are controlled by switches connected in advance and at the outputs thereof. The switches themselves are controlled by signals from the control network, for example as shown in FIG. 12.

The basic concept of the system of the present invention, and the method thereof, is to use a system corresponding to a data processing or micro computer to process operating parameters. If the programming sequence is simple - a sequence which can be determined, for example, by a freely programmable memory - and if the control unit uses intensive memory characteristics - then an overall system can be obtained which has few problems and which can be readily constructed.

The embodiment, as described, having an external data memory 39, permits many ways to introduce data and external conditions in the computation and the data used therewith; it thus permits universal applicability to determine the various control parameters for the vehicle.

Various changes and modifications may be made within the scope of the inventive concept.
list of components used

We claim:
1. System to determine the timing of a periodically repetitive event with respect to a predetermined angular reference position of a rotating body of an apparatus, in which said timing is determined as a function of an operating parameter of the apparatus, the timing of the periodically repetitive event, with respect to said predetermined reference position of the body being controlled by a square wave electrical signal having a leading flank, the time occurrence of which, with respect to said predetermined reference position, is obtained by a first computation, and a trailing flank, the time occurrence of which with respect to the leading flank thereof is obtained by a second computation based on the timing of the leading flank with respect to said predetermined reference position, said system comprising means providing clock control signals a transducer means (21) generating a first marker signal related to the predetermined reference position of the body in the apparatus, and further generating a second marker signal relating to rotation of said body over a predetermined angular interval beyond said predetermined reference position;

and a digital data processing system carrying out said first computation and calculating, during time intervals related to angular intervals of rotation of said body beyond said predetermined reference position, digital electrical control signals having calculated values which are representative, in digital form, of operating parameters related to and characterizing the operation of the apparatus;

counter and count decode logic means (80, 81) carrying out said second computation and establishing, by timed sequential counting of said clock control signals, in intervals subsequent to said first marker signal, the temporal relationship between the angular position of the rotating body and said event under control of said calculated digital electrical control signals, wherein the digital processing system carrying out said first computation, and the counter and decode logic means (80, 81) counting and thereby carrying out said second computation, are operating simultaneously, independently from each other, and during time overlap;

| numbers of the block | | | component | |
|---|---|---|---|---|
| 50,56,67,81,82,96, 101,102 | counter | TTL | SN 74191 | TI |
| 72 | counter | TTL | SN 74161 | TI |
| 61,62,63,70,84,95 | transmission-gate | C-MOS | CD 4016 | RCA |
| 39,78,79,91,100,104 | PROM | P-MOS | 1702A | INTEL |
| 51,73 | register memory | TTL | SN 74173 | TI |
| 66 | read-write memory | TTL | SN 7489 | TI |
| 92 | parallel-series converter | TTL | SN 74164 | TI |
| 94 | parallel-series series-parallel converter | TTL | SN 74195 | TI |
| 32 | arithm. unit | TTL | SN 74S281 | TI |
| 34 | shift-register with input and output enable | TTL | SN 74173 | TI |
| 65 | counter with decoding network and switches determines the operations performed for every time step by the output portion of the ignition computer | | | | and wherein said data processing system and said counter and decode logic means (80, 81) includes separate units comprising a main control unit (33);

an arithmetic unit (32) to carry out all calculations including calculation of the occurrence, in time, of said leading flank and the trailing flank of said square wave electrical signal;

a data exchange control unit (38);

an external data memory unit (39) storing the relationship or function between change in operating parameters of the apparatus and the timing of the event;

a buffer memory unit (38);

at least one input circuit unit (30, 31);

at least one output circuit unit (36), the output circuit unit (36) providing a voltage pulse in the form of said square wave electrical signal as a function of the angle of rotation of said body from said predetermined reference and as a function of at least one of said operating parameters of the apparatus;

and a bus system (41, 42, 43) interconnecting said units (33, 32, 38, 39, 34, 30, 31, 36), said main control unit also controlling selective connection of said external data memory (39) to said bus system to supply data to said bus system, said data exchange unit (38) and said arithmetic unit (32).

2. System according to claim 1, wherein said at least one input circuit (30, 31) comprises (FIG. 5) a memory (51); and sensing means (22, 24) are provided applying signals representative of an operating parameter to the input circuit, the input circuit providing a digital signal stored in said memory (51).

3. System according to claim 2, wherein said at least one input circuit (30, 31) is responsive to electrical signals having a variation of at least one of: frequency; duty cycle; combination of frequency and duty cycle.

4. System according to claim 1, wherein said apparatus comprises an automotive internal combustion engine, and the data stored in the data memory (39) store the function or relationship between engine operating parameters and the timing of a voltage pulse controlling at least one of the operations of the engine: ignition; fuel injection.

5. System according to claim 1, wherein said data processing system (20) comprises means converting the angular interval between said predetermined reference position and the final end of the interval to a time relation as represented by predetermined numbers of clock pulses starting upon generation of said first marker signal related to said predetermined reference position.

6. System according to claim 1, further comprising additional counter means (FIG. 7: 67, 72) and logic and memory means (AND; 73) sensing predetermined sequential conditions related to sequential events, and providing a special control signal upon sensing said predetermined sequential conditions.

7. System according to claim 6, wherein said apparatus comprises an internal combustion engine; said sequential conditions are sequential ignition pulses occurring beyond predetermined time intervals; and said logic and memory means provides a control output signal to inhibit ignition current through the ignition coil of the ignition system of the internal combustion engine if the engine operates below a predetermined speed, or is stopped.

8. System according to claim 7, including means (FIG. 4: 45) to sense engine speed;

and wherein when the sensed engine speed is below a preset value, the output from said transducer means (21) is connected to pass to the output (75) of the output circuit unit.

9. System according to claim 1, wherein said apparatus comprises an internal combustion engine;

means (FIG. 4: 45) are provided sensing engine speed;

and wherein, when the sensed engine speed is below a predetermined value, the output from said transducer means (21) is connected to pass to the output (75) of the output circuit.

10. System according to claim 1, wherein the digital data processing system (20) operates serially.

11. System according to claim 1, wherein said apparatus comprises an internal combustion engine; and said transducer means (21) operates in synchronism with the crankshaft to the engine and having a marker to provide one of said marker signals at an angular position of the crankshaft of the engine representative of at least one of: ignition timing; fuel injection timing upon starting of the engine.

12. System according to claim 1, wherein said apparatus comprises an automotive internal combustion engine;

the transducer means (21) comprises a disk coupled to and operating in synchronism with the crankshaft of the engine;

and wherein said controlled event comprises at least one of: a voltage pulse, time related to crankshaft angle in respect to operating parameters of the engine;

a fuel injection pulse, time related to operating parameters of the engine;

and wherein said operating parameters of the engine include: engine speed; engine loading.

13. System according to claim 1, wherein said clock control signals are applied at different clock frequencies to said digital data processing system carrying out said first computation and to said counter and count decode logic means carrying out said second computation.

14. System according to claim 13, wherein said apparatus comrises an automative internal combustion engine, and said operating parameters of the engine include: engine speed; engine loading;

and wherein said first and said second computation at said respectively different clock frequencies process said signals representative of engine speed, and engine loading at said respectively different clock frequency.

15. System according to claim 1, wherein more than one input circuit is provided;

and at least one of the input circuits has separate memory means (51) having signals representative of respective separate operating parameters stored therein, said input circuits being connected to said bus system (41, 42, 43) to supply the signals representative of said parameters to the arithmetic unit (32) as commanded by said main control unit (33).

16. System according to claim 1, wherein said transducer means (21) comprises a segmental transducer providing said first marker signal upon sensing the beginning of a segment and said second marker signal upon termination of the segment;

and wherein said digital data processing system carrying out said first computation commences computing upon sensing of the first marker signal from said transducer means, and calculating within a first time interval commencing upon generation of said first marker signal.

* * * * *